US005223075A

United States Patent [19]

Sims

[11] Patent Number: 5,223,075

[45] Date of Patent: Jun. 29, 1993

[54] CORRUGATED CARTON SEALING APPARATUS

[75] Inventor: Russ Sims, Yakima, Wash.

[73] Assignee: Sims Manufacturing Co., Inc., Yakima, Wash.

[21] Appl. No.: 803,162

[22] Filed: Dec. 3, 1991

[51] Int. Cl.[5] .......... B32B 31/18

[52] U.S. Cl. .......... 156/468; 156/486; 156/522; 53/138.1; 53/416; 53/419

[58] Field of Search .......... 156/468, 486, 522; 53/218, 415, 416, 419, 441, 133, 137, 139.3

[56] References Cited

U.S. PATENT DOCUMENTS

| | | | |
|---|---|---|---|
| 3,954,550 | 5/1976 | Patterson | 156/486 |
| 4,642,157 | 2/1987 | Cavanagh | 156/522 |
| 4,936,945 | 6/1990 | Marchetti | 156/468 |

OTHER PUBLICATIONS

"AccuGlide Taping Heads from 3M", 3M Packaging Systems, a Division of 3M Corporation (1990) product brochure.

*Primary Examiner*—Caleb Weston

*Attorney, Agent, or Firm*—Wells, St. John, Roberts, Gregory & Matkin

[57] ABSTRACT

A preferred embodiment of a corrugated carton sealing apparatus 10 is illustrated in the Figs. having tape application heads 32 and 34 for applying adhesive tape strips 36 to the top and bottom surfaces of the carton to seal the carton. Each of the tape application heads 32 and 34 have a leading application roller 62 and a trailing application roller 68 that are moved in unison with each other from extended positions as illustrated in FIGS. 1 and 2, to retracted positions as illustrated in FIGS. 4 and 5. The leading application roller 62 travels in a path shown by the curve illustrated in FIG. 7 to apply pressure to a beginning leading edge 38 of the tape to firmly affix the tape edge 38 to the leading surface 14 of the carton. The tape application head 32 includes a tape feed 84 for feeding adhesive tape through the tape application head for application to the container. The tape feed 84 includes a tape stop means 86 that is responsive to the movement of the rollers 62 and 68 between their extended positions and their retracted positions in which the tape stop means 86 automatically prevents further feeding of the tape through the tape application head when the rollers move from their retracted positions to their extended positions.

27 Claims, 6 Drawing Sheets

CORRUGATED CARTON SEALING APPARATUS

TECHNICAL FIELD

This invention relates to automatic high speed tape sealing apparatus for applying adhesive tape to folded flaps of corrugated cartons to seal the cartons.

BACKGROUND OF THE INVENTION

Although tape application heads have been used for many years in conveyor driven carton sealing equipment, such previous tape application heads, although operating quite satisfactorily at low speed tape application speeds, are deficient for high speed tape application for applying tape to cartons that are moving at speeds in excess of 120 feet per minute. At such high speeds, the application rollers contact the carton for a very short period of time, usually with widely varying application of pressures which may crush a portion of the carton particularly along the leading corner and folded flap surface. Additionally, it is not unusual for each prior art heads to apply the adhesive tape in a misregistered application in which the leading edge is longer than the trailing end or vice versa.

Additionally, it has become more difficult for tape application heads to apply the leading end firmly to the leading surface of the carton. Attaching the leading tape end requires pressure at a precise location. If the leading tape end is too long, a portion of the tape extends beyond the front application roller, and never receives pressure from the roller. The result is a loose end that can stick to adjacent cartons and be torn loose. If the leading end of the tape is too short, the tape roller may fail to contact the tape and no pressure is applied anywhere on the tape so that the carton continues on with no tape being applied to the container. Additionally, many of such prior art tape application heads are unable to cut the tape into a strip in which the leading end and the trailing end are the same length.

Furthermore, it is not unusual for the prior art application heads to be quite complicated and incorporate many parts which are more likely to fail and cause additional maintenance to be required.

A principal advantage of this invention is to provide a tape application head for cartons sealing equipment which is able to accommodate cartons that are traveling at speeds between 120 and 140 feet per minute, and to accurately register the applied tape to the carton with the leading end and the trailing end being of the same length. Furthermore, it is the objective of this invention to provide a tape application head that accurately positions a beginning end of the tape with respect to the leading roller to apply pressure to the leading edge to minimize the presence of loose ends that are not affixed to the carton.

A further objective is to provide a high speed tape application head that is simple in design, has a minimum of moving parts, and is sturdy and easy to maintain.

These and other objects and advantages of this invention will become apparent upon reading the following detailed description of a preferred embodiment.

BRIEF DESCRIPTION OF THE DRAWINGS

A preferred embodiment of this invention is described below with reference to the accompanying drawings, which are briefly described below.

DETAILED DESCRIPTION OF THE PREFERRED EMBODIMENTS

This disclosure of the invention is submitted in furtherance of the constitutional purposed of the U.S. Patent Laws "to promote the progress of science and useful arts" (Article 1, Section 8).

Figure 1:
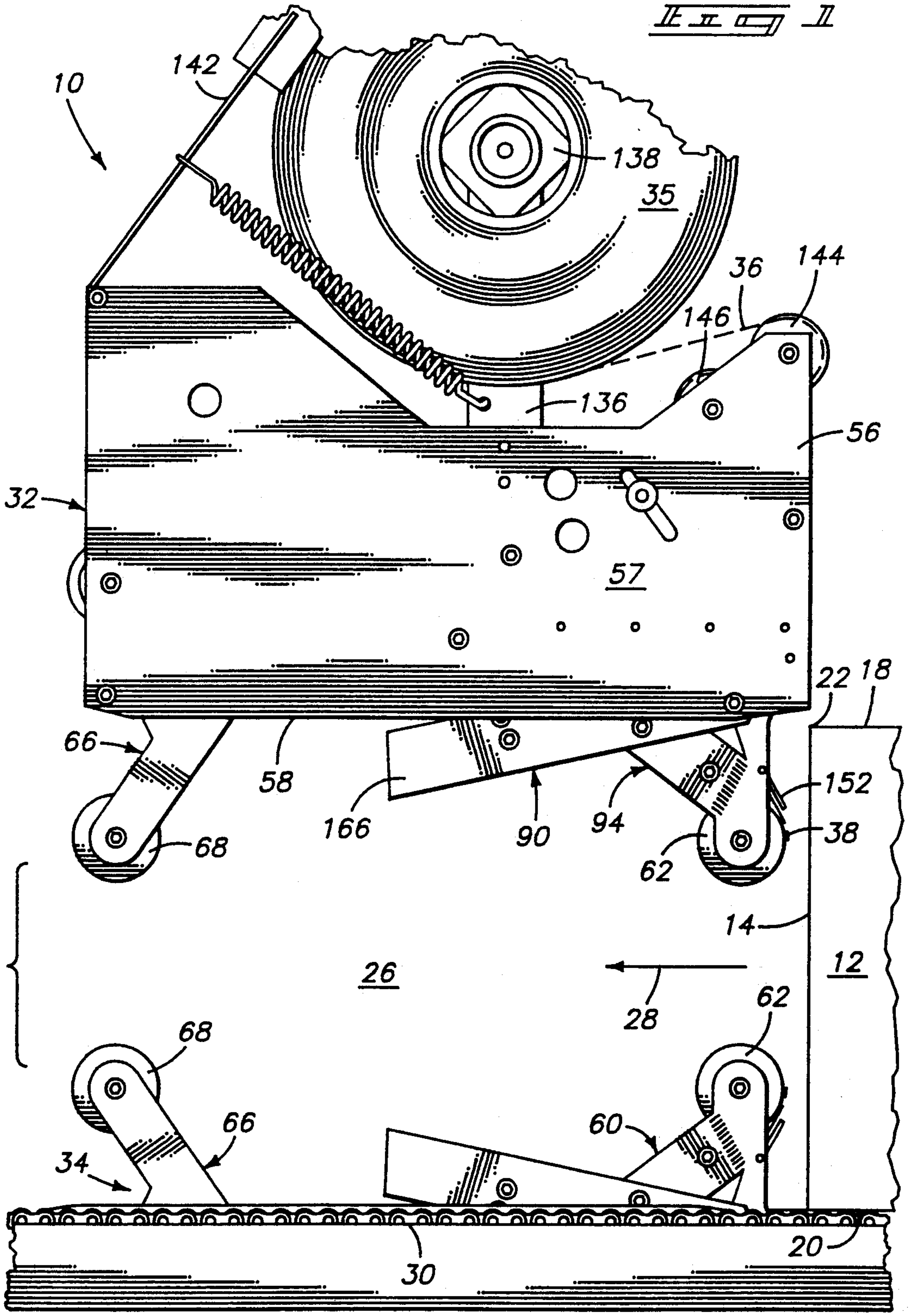
FIG. 1 is a fragmentary side elevational view of an corrugated carton sealing apparatus illustrating an upper and a lower tape application head assembly for applying adhesive tape to top and bottom flaps surfaces of a corrugated carton to enclose the carton.

Referring now in detail to the drawings, there is illustrated in FIG. 1 a corrugated carton sealing apparatus, generally designated with the numeral 10 for applying strips or "C" clips of adhesive tape 36 to the top and bottom of corrugated cartons or containers 12. Each of the cartons has a leading surface 14, a trailing surface 16, and an upper folded flap or slotted surface 18 and a bottom folded flap or slotted surface 20. Each carton 12 additionally has leading edges 22 and trailing edges 24.

The cartons 12 are moved through a carton sealing station 26 in a prescribed path indicated by arrow 28. The cartons 12 are moved through the carton sealing station 26 by a conveying means 30. The strip of adhesive tape 36 is applied and affixed to the folded flap surfaces 18 and 20 along center seams to seal and enclose the carton. The adhesive tape 36 has a sticky face surface. Preferably the adhesive tape 36 is supplied from a wounded source 35 such as roll in which the adhesive 36 is unwound from the roll and then threaded through the tape application head and then applied to the carton 12.

The sealing apparatus 10 preferably includes an upper tape application head 32 and a lower tape application head 34 for respectively applying the "C" tape clips to the upper and lower folded flap surfaces 18 and 20 respectively to seal the upper and bottom ends of the carton.

For purposes of description, each strip of the adhesive tape 36 is defined as having a beginning edge 38, a leading surface segment 40, a leading edge segment 42, a folded flap surface segment 44, a trailing edge segment 46, a trailing surface segment 48, and a ending edge 50. Such segments are applied to respective surfaces and edges of the carton 12 (FIGS. 2–6).

For purposes of illustration, only the upper tape application head 32 will be described. The lower tape applicatin head 34 is identical except that it is inverted for application of the tape to the lower folded flap surface 20.

The upper tape application head 32 includes a tape application head housing 56 having side plates 57 with guide edges 58 that may engage and securely hold the folded flap surface 18 in a firm condition as the tape is being applied. The tape application head 32 includes a leading application roller assembly 60 having a leading application roller 62 mounted thereon for movement between an extended position illustrated in FIGS. 1 and 2 and a retracted position illustrated in FIGS. 4 and 5. FIG. 3 illustrates the leading application roller 62 moving from the extended position toward the retracted position while applying the beginning edge 38 and leading surface segment 40 of the tape to the leading surface 14 of the container. FIG. 6 illustrates the leading application roller moving from the retracted position to the extended position to again place the leading application roller 62 in the path of the oncoming or succeeding carton.

Figure 2:
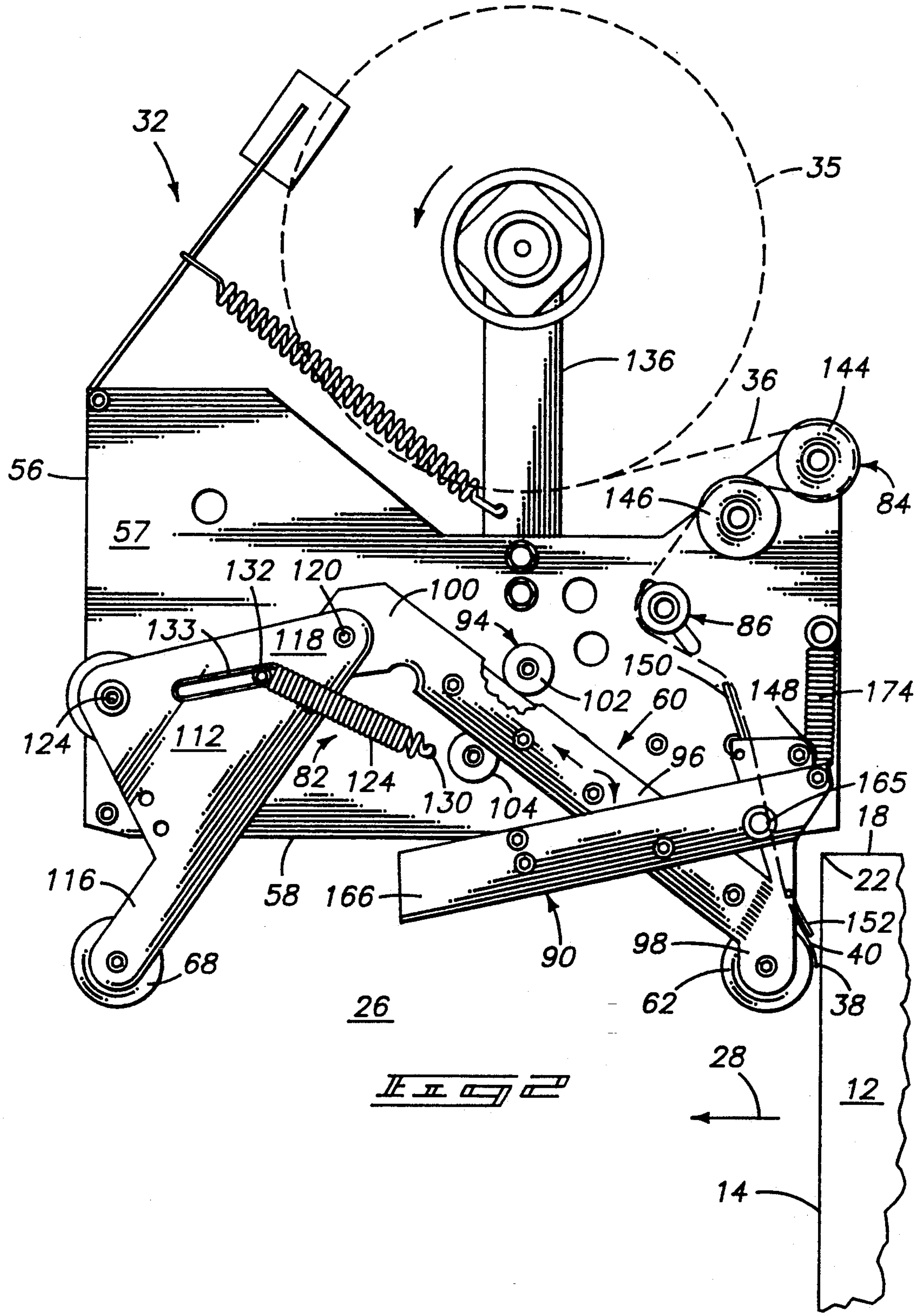
FIG. 2 is a fragmentary side elevational view of the upper tape application head with leading and trailing application rollers in their extended positions projecting the leading application roller into the path of the cartons to initially apply a beginning end of the tape to a leading surface of a carton.
Figure 3:
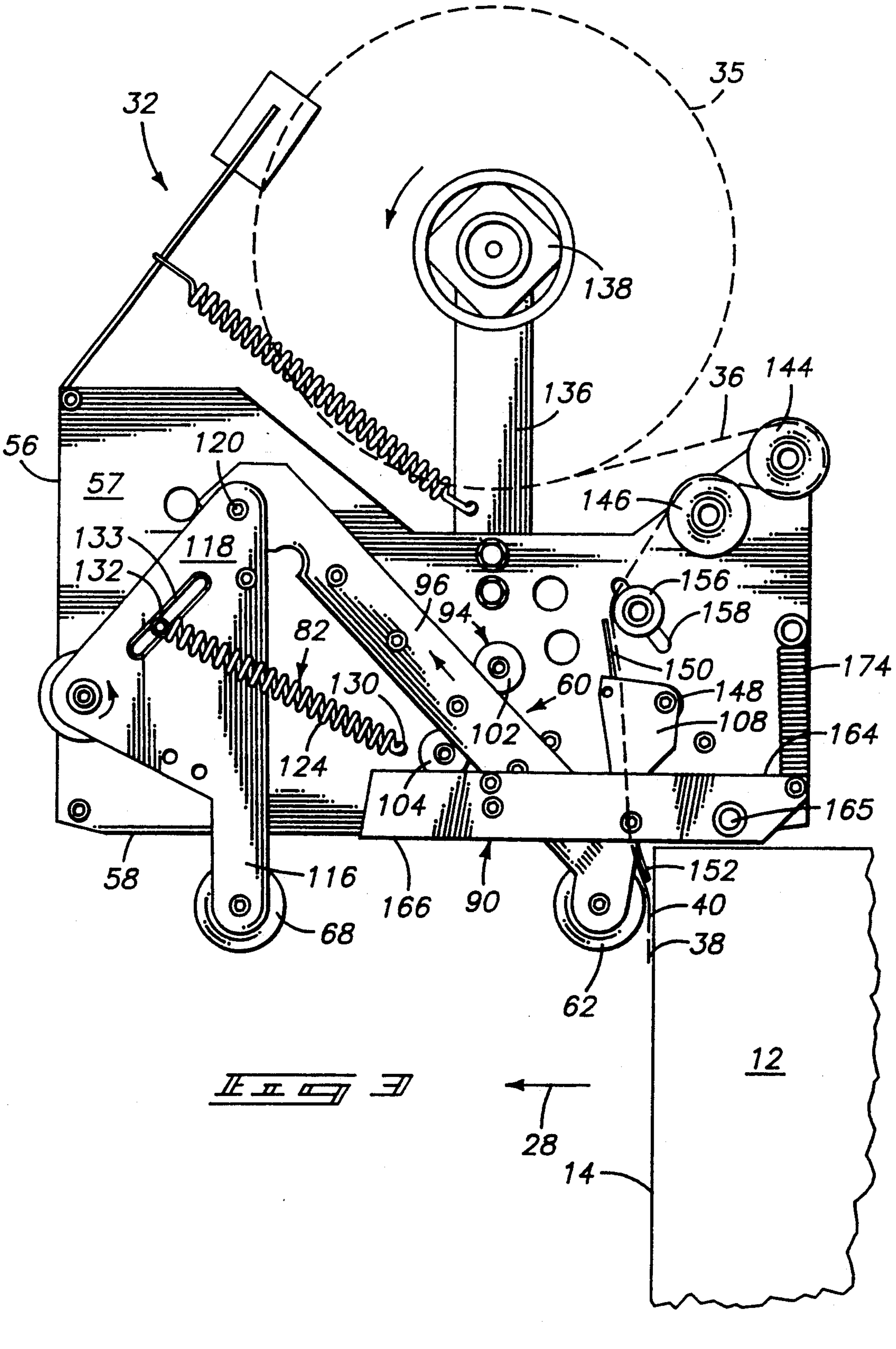
FIG. 3 is a fragmentary side elevational view similar to FIG. 2 except showing the application rollers moving from their extended positions toward their retracted position with the leading application roller applying a leading tape segment to the leading surface of a carton.
Figure 4:
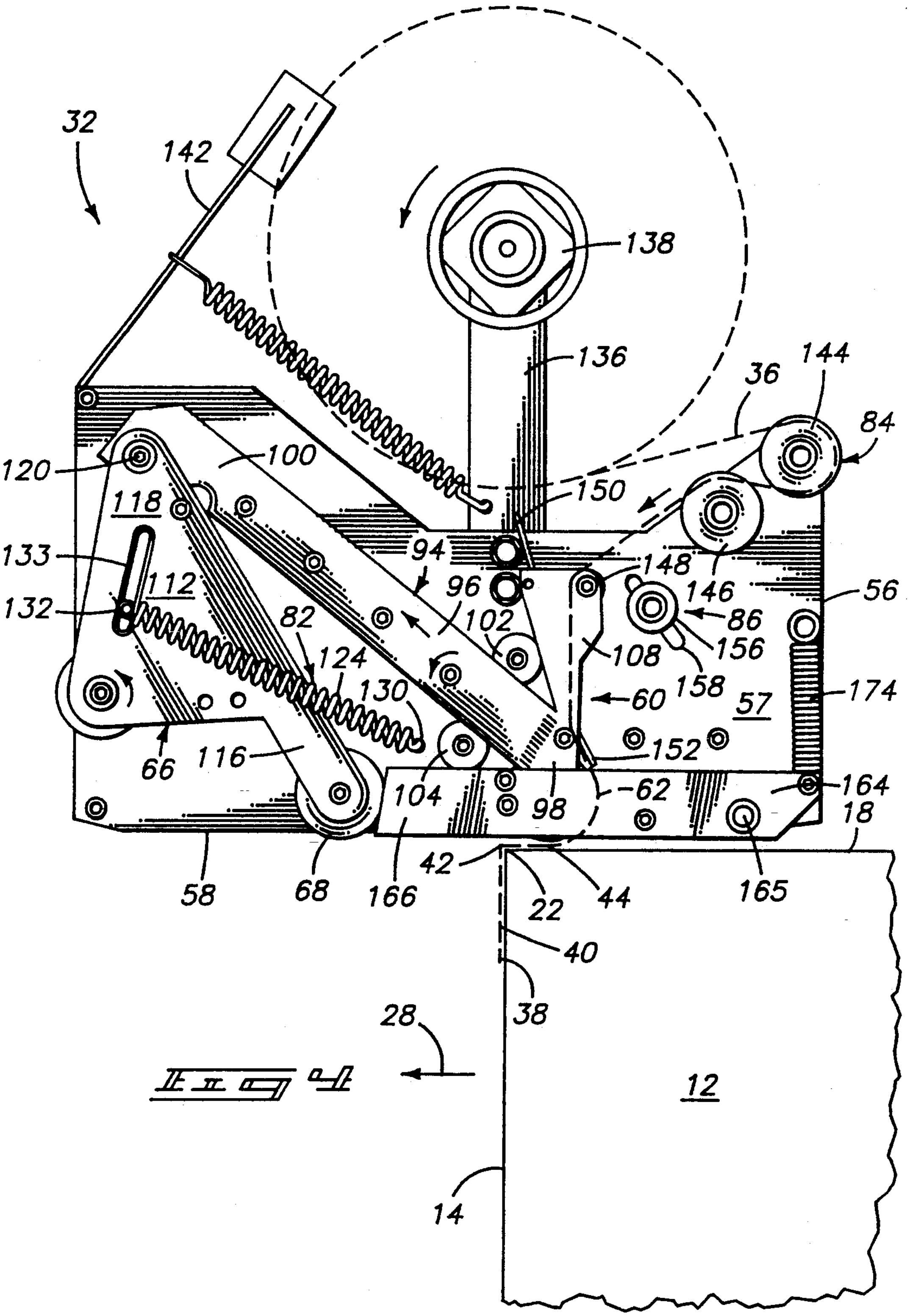
FIG. 4 is a fragmentary side elevational view similar to FIG. 3 except showing the application rollers in their retracted positions with the leading application roller applying tape to the horizontal folded flap surface.
Figure 5:
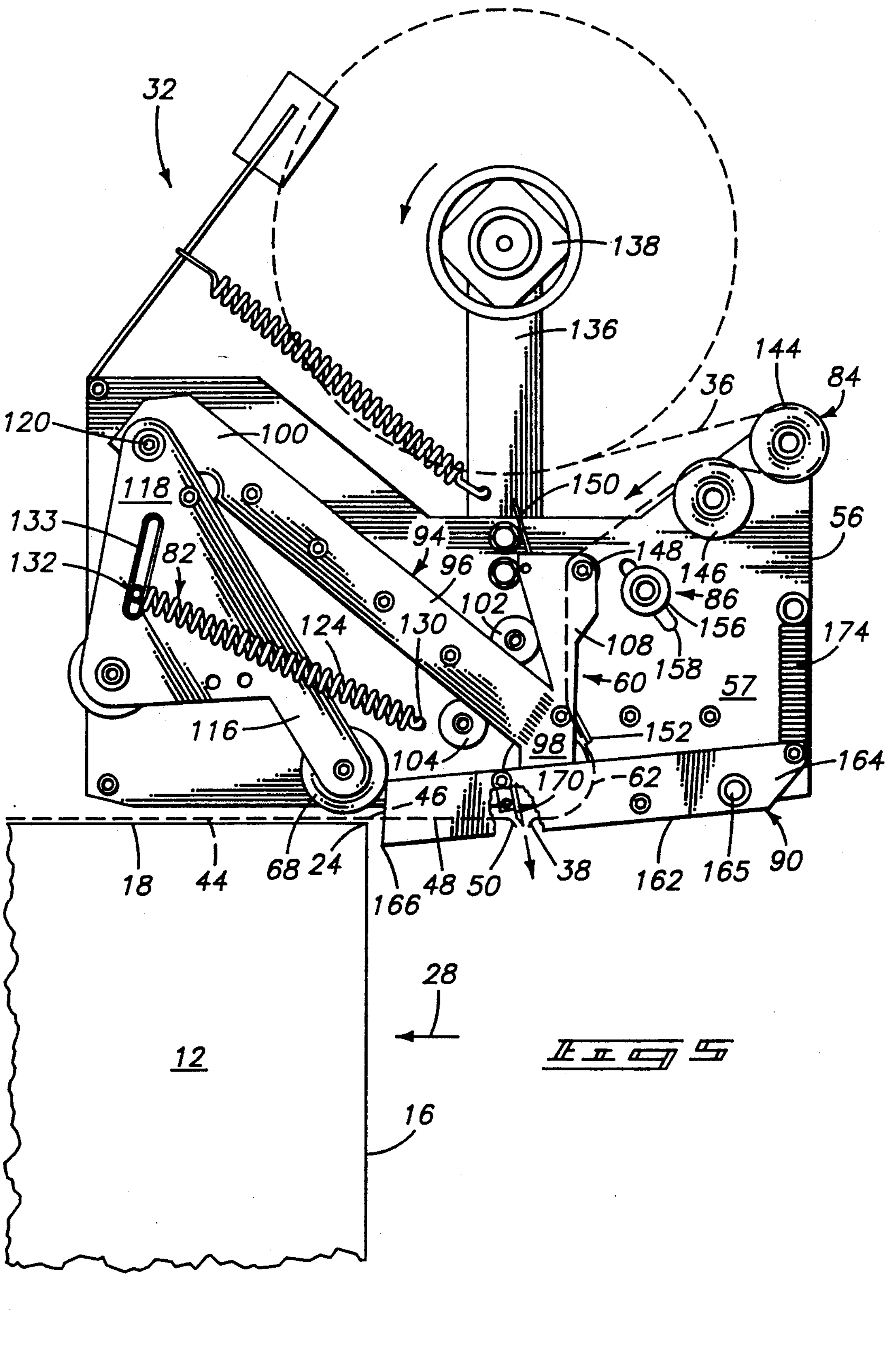
FIG. 5 is a fragmentary side elevational view similar to FIG. 4 except showing a tape cutter element for cutting a trailing end of the tape after a trailing surface of the carton has moved past the leading application roller.
Figure 6:
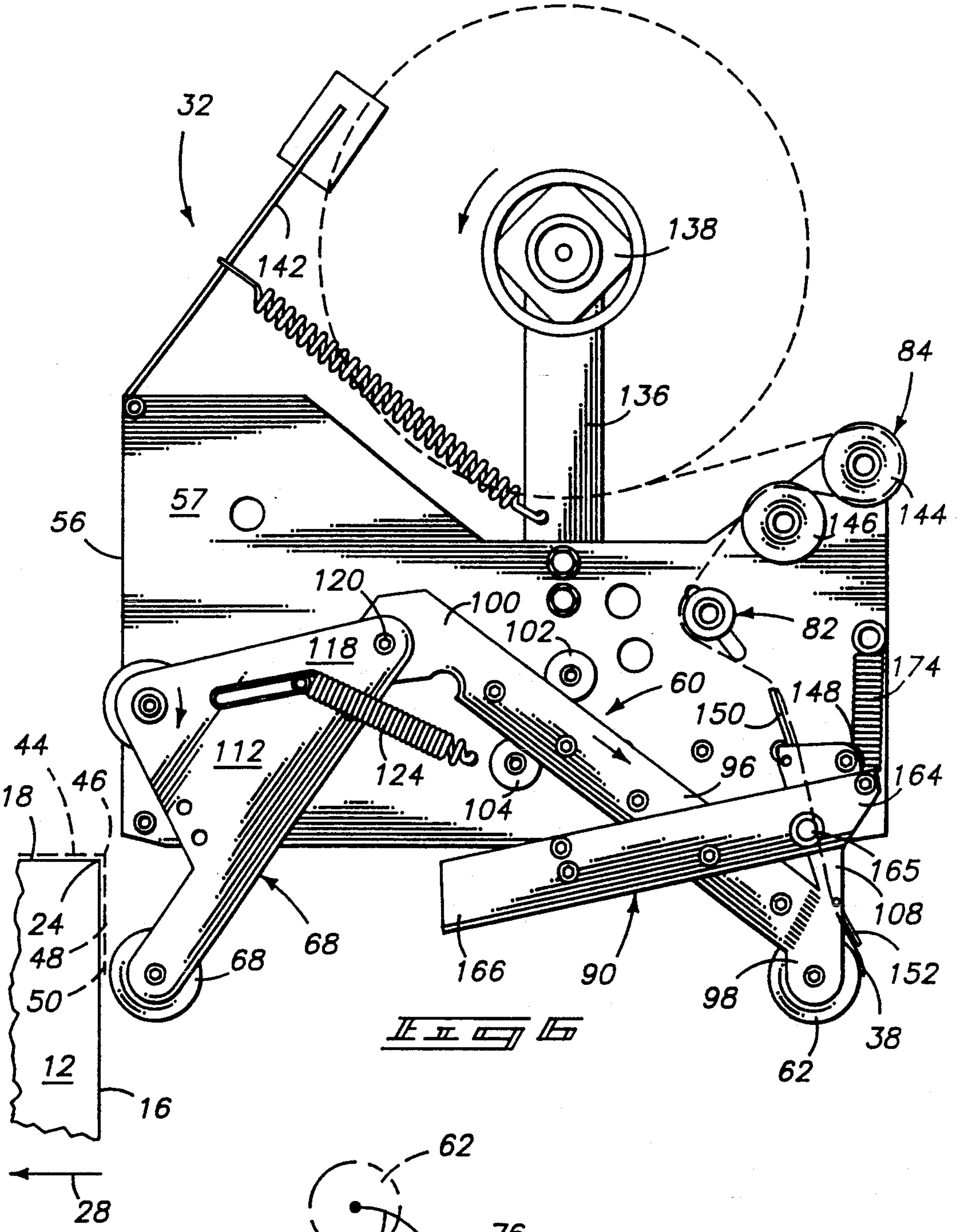
FIG. 6 is a fragmentary side elevational view similar to FIG. 5 except showing the application rollers moving to their extended positions with the trailing application roller applying a trailing tape segment to the trailing surface of the carton.

The tape application head 32 includes a trailing roller assembly 66 having a trailing application roller 68 that is moveable between an extended position illustrated in FIGS. 1 and 2 to a retracted position illustrated in FIGS. 4 and 5. The purpose of the trailing application roller 68 is to additionally apply pressure to the folded flap surface segment 44 of the tape when the trailing application roller 68 is in the retracted position and for applying the trailing surface segment 48 to the trailing surface 16 as illustrated in FIG. 6.

The path of the leading application roller 62, as it moves between its extended position illustrated in FIGS. 1 and 2 and its retracted position in FIGS. 4 and 5, is shown as an "S" shaped curve. The "S" shaped curve has a gradual slope first section 74 enabling the leading application roller 62 to move predominately rearward to firmly pressurize the beginning tape edge 38 firmly to the leading surface 14. The curve 70 includes a steeper slope second section 76 indicating the inward and rearward movement of the leading application roller 62 as illustrated in FIG. 3 for applying the leading edge segment 40 to the leading surface 14. The curve 70 further includes a gradual slope third section 78 for enabling the leading application roller 62 to move predominately rearward as its approaches the retracted position to minimize any damage to the leading edge 22 of the carton. The "S" shaped curve 70 provides for inward or vertical movement of the roller 62 that has (1) a rather gradual initial acceleration as illustrated by the first section 74, (2) then a more rapid acceleration as illustrated by the second section 76 along the leading surface 14, and (3) then a reduced acceleration during the third section 78 as the roller approaches the retracted position. Such a path is very important in enabling the carton sealing apparatus 10 to handle cartons that are moving at high rates of speed between 120 and 140 feed per minute while accurately applying the beginning edge 38 and the leading surface tape segment 40 to the leading surface 14. Accurate and consistent results are required at such high speeds.

The tape application head 32 includes a biasing means, generally designated with the numeral 82 for biasing the leading application roller 62 and trailing application 68 from their retracted positions to their extended positions to apply application pressure against the carton surfaces to firmly affix the adhesive tape 36 to the carton surfaces.

Additionally, the tape application head 32 includes a tape feed or tape dispenser 84 for receiving the adhesive tape 36 from the source 35 and for feeding the tape through the tape application head 32 to the leading application roller 62 in a very accurate and consistent manner. The tape feed 84 includes a tape stop means generally designated with the numeral 86 that is responsive to the movement of the leading application roller 62 between its extended position and its retracted position for initially stopping the feeding of the adhesive tape through the tape application head when the tape application head is spaced from its retracted position and for enabling or permitting further feeding of the adhesive tape through the tape application head when the leading application roller 62 is in the retracted position as illustrated in FIGS. 4 and 5.

Additionally, the tape application head 32 includes a tape cutting assembly 90 that is responsive to the movement of the carton through the sealing station 26 for selectively cutting the strip or "C" clip from the tape 36 toward the completion of the tape application process as illustrated in FIG. 5.

The leading application roller assembly 60 includes a leading roller support 94 for supporting the leading application roller 62 to enable the roller 62 to move translationally and pivotally between the extended position and the retracted position as illustrated in FIGS. 2, 3 and 4. The assembly 60 includes an elongated arm 96 that extends between an arm end 98 that carries the roller 62 and an opposite arm end 100 referred to as the pivot end. The elongated arm 96 is mounted for movement between side roller bearings 102 and 104 that engage tracks in the sides of the elongated arms 96 as illustrated in FIG. 2.

Pressure of the leading surface 14 of the carton 12 against the leading application roller 62 initiates the movement of the elongated arm in initial pivot movement about a pivot axis intermediate the bearings 102 and 104 as illustrated in the "S" shaped curve 70. Further rearward movement causes the elongated arm 96 to move inward or upward at a steeper slope as illustrated by the curved section 76 in FIG. 7. As the elongated arm approaches the retracted position, the arm end 100 is moved laterally to decrease the slope of the path as illustrated by the third curve section 78.

Additionally, the elongated arm 96 includes a tape guide support 108 that operates in conjunction with the tape feed 84 for directing the tape through the tape application head to a position alongside the leading application roller 62.

Figure 7:
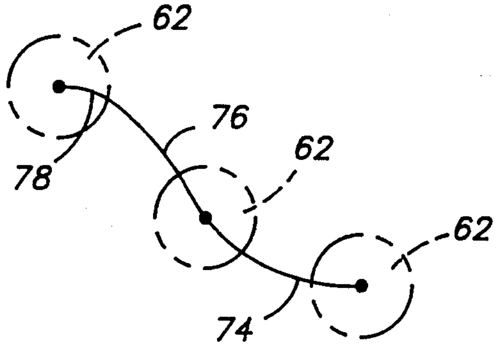
FIG.7 is a schematic illustrating the curved path of the leading application roller when the roller moves between its extended position and its retracted position.

The trailing roller assembly 66 includes a pivot frame 112 that has a triangular shape that pivots around a fixed pivot axis 124 in an arc illustrated in FIGS. 3, 4 and 6. The pivot frame 112 includes (1) a trailing roller support projection 116 for carrying the trailing application roller 68, and (2) an intermediate projection 118 carrying a moveable pivot axis 120 that is attached to the pivot arm end 100 of the leading application roller 60. Such pivotal interconnection causes the leading application roller 62 and trailing application roller 68 to move in unison between their retracted positions and their extended positions as illustrated in the drawings. As the pivot frame 112 pivots, the moveable pivot axis 120 moves the upper arm end 100 in a lateral movement to pivot the lower arm end 98 in the path prescribed by the curve 70 (FIG. 7). As previously mentioned, the elongated arm 96 is mounted for both lateral or pivotal movement and translational movement as the elongated arm 96 moves from the extended position to the retracted position. The pivotal movement is caused by the movement of the pivot axis 120 as the support 110 moves about the fixed pivot axis 124.

The biasing means 82 is comprised of a tension spring 124 having one end 130 fixed to the housing 56 and the other end 132 affixed to an element that rides in a slot 133. The angle of the slot 133 and its length is designed to cause the spring to increase the tension of the tension spring 124 to firmly pressure the adhesive tape against the carton surfaces. However, as the application rollers 62 and 68 approach their retracted position, the tension is not progressively increased, but maintains a rather constant uniform tension so as not to crush edges 22 and 24 of the carton or the folded flap surface 18.

The tape feed 84 includes a bracket 136 mounted to the housing 56 that extends upward to a tape holder and tensioner 138 for receiving the roll 35 of the adhesive tape 36 as illustrated in FIGS. 1–6. Optionally, the tape feed includes a peripheral drag 142 that engages the periphery of the adhesive roll to place a tension on the tape 36 as it is being dispensed.

The tape feed 84 further includes an initial tape roll 144 mounted on the housing 56 for initially receiving the tape and winding the tape 36 from the roll 35. The tape roller 144 rotates around a fixed axis. The tape 36 is then threaded over a one-way tape roller 146 that rotates about a fixed axis or the housing 56 as illustrated in FIG. 2. The one-way tape roller 146 enables the tape to be dispensed from the roll in a forward direction, but prevents the tape from moving in a rearward direction. A guide roller 148 is mounted on the arm projection 108 that moves with the leading application roller 62. It should be noted that the guide roller 148 moves with the elongated arm 96 and decrease the distance between the guide roller 148 and the one-way roller 146 when the leading application roller 62 moves from the extended position to the retracted position and then extends the distance between the guide roller 148 and the one-way tape roller 146 when the leading application roller 62 moves from the retracted position illustrated in FIGS. 4 and 5 to the extended position illustrated in FIG. 6. The tape is additionally guided through the tape application head assembly by guides 150 and 152 that are additionally mounted at the arm end 98 for guiding the movement of the tape from the source 35 to the leading application roller 62. The guides 150 and 152 channel and guide the forward end of the tape to a position immediately adjacent the leading application roller 62 to enable the roller to firmly affix the beginning end 38 to the leading surface 14 as illustrated in FIG. 2.

The tape stop means 86 includes a non-rotating cylinder 156 that is mounted to the housing 56 intermediate the one-way tape roller 146 and the guide roller 148. The non-rotating cylinder 156 includes a curved surface that engages a sticky face side of the adhesive for stopping further movement or feeding of the adhesive tape through the tape application head when the sticky face surface of the tape engages the non-rotating cylinder 156. The cylinder 156 is adjustably mounted in an adjustment slot 158 to adjust the position of the cylinder 156 to in turn adjust the length of the leading edge tape segment 42 and the trailing edge segment 46. When the leading application roller 62 is in the extended position, the path of the tape wraps around the cylinder 156 to prevent further feeding of the tape as illustrated in FIGS. 2 and 3. As the leading application roller 61 continues its movement to the retracted position, the guide roller 148 moves past the cylinder 156 releasing the tape from the cylinder 156 enabling the tape to be further fed through the tape application head as illustrated in FIGS. 4 and 5. When the leading application roller 62 is moved from the retracted position illustrated in FIG. 5 to the extended position illustrated in FIG. 6, the path of the tape is again brought into engagement with the stationary cylinder 156 to prevent further feeding of the tape. The tape stop means 86 accurately registers the tape strip 36 to the carton so that the leading surface tape segment 40 and the trailing edge tape segment 46 are accurately registered. The tape stop means 86 is responsive to the movement of the leading application roller 62 to cause the tape 36 to be accurately stopped in its feeding as the roller 62 moves from its retracted position to its extended position. Likewise, the stop means 86, in being responsive to the movement of the leading application roller 62, is rendered ineffective to permit further feeding of the tape through the tape application head when the application roller 62 is moved to the retracted position illustrated in FIGS. 4 and 5.

The tape cutting assembly 90 includes an elongated cutter arm frame 162 having a pivot end 164 that pivots about a fixed pivot axis 165. The cutter arm is biased downward by a spring 174 with end 166 extending downward into the path of the carton. As the carton engages the arm frame 162, the frame 162 is pivoted upward about the pivot axis 165 as illustrated in FIGS. 3 and 4. As illustrated in FIG. 5, when the trailing surface 16 of the carton passes the location of the end 166, the frame 162 pivots downward bringing a tape cutting knife 170 into engagement with the tape to sever the tape, leaving the trailing end segment 48 projecting outward from the trailing edge 24 of the carton as illustrated in FIG. 5. The severance of the tape also forms a new beginning edge 38 for a succeeding strip of tape. The cutting knife 170 is intermediate the application rollers 62 and 68.

FIGS. 2–6 show the general operation of the apparatus in a sequential fashion in which FIG. 2 illustrates the leading application roller 62 beginning to move from its extended position. It should be noted that the leading roller 62 presses the beginning tape edge 38 firmly against the leading surface 14, and then moves upwardly to apply the leading surface tape segment 40 to the leading surface 14 as illustrated in FIG. 3. As previously mentioned, the leading application roller 62 follows the general "S" shaped curve 70 to make sure that the application roller has sufficient time to accurately press the leading edge 38 against the carton before moving more rapidly upwardly along the leading surface 14. It should be noted that additional tape is not being fed through the tape application head as the tape path is wrapped around the cylinder 156. The retraction of the leading application roller 62 moves upwardly to expose the leading surface tape segment 40 and the leading edge tape segment 42 to their respective surfaces as the leading application roller 62 moves to the retracted position. As illustrated in FIG. 4, the tape stop means 56 is rendered ineffective, enabling the tape to be continuously fed as the carton moves underneath the tape application head with the rollers 62 and 68 firmly applying the folded flap tape segment 44 to the folded flap surface 18.

As the carton moves past the leading application roller 62, the trailing application roller 68 maintains pressure contact with the folded flap surface 18. When the trailing surface 16 moves past the end 166 of the elongated cutter arm frame 162, the end 166 moves downward to bring the knife 170 into a severance position to sever the strip 36 from the tape. As illustrated in FIG. 6, once the trailing surface 16 moves past the trailing application roller 68, the biasing means urges the rollers 62 and 68 to their extended position. It should be noted that trailing application roller 68 moves downward and rearward, firmly engaging the trailing edge segment 48 to the trailing surface 16. As previously mentioned, the path of the tape is again brought into engagement or wrapped around the stop 156 to prevent further feeding of the tape through the tape application head and to accurately align the beginning tape edge 38 relative to the leading application roller 62.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A corrugated carton sealing apparatus for applying adhesive tape to folded flaps of corrugated cartons, comprising:

a) conveying means for moving a plurality of corrugated cartons sequentially past a sealing station in a prescribed path, in which each carton has (1) a leading surface, (2) a folded flap surface, and (3) a trailing surface;

b) a tape application head mounted at the sealing station for applying a strip of adhesive tape to the carton surfaces of each carton as each carton is moved in the prescribed path past the sealing station;

c) said tape application head having a housing supported at the sealing station;

d) said tape application head having a leading application roller and a trailing application roller mounted to the tape application head housing for movement between (1) an extended position with the application rollers projecting into the path of each carton for engaging the leading and trailing surfaces, and (2) a retracted position alongside the path of each carton for engaging the folded flap surface;

e) said tape application head having a tape feed for unwinding adhesive tape from a wound source of adhesive tape and feeding the unwound adhesive tape to the leading application roller; and f) said tape feed having feed stop means for preventing unwinding of the adhesive tape when the application rollers are in the extended position and for permitting the unwinding of the adhesive tape when the application rollers are in the retracted position.

2. The corrugated carton sealing apparatus as defined in claim 1 wherein the tape feed directs the unwound adhesive tape in a prescribed tape path through the tape application head from the tape source to the leading application roller and wherein the feed stop means projects into the tape path to prevent further feeding of the tape from the tape source through the tape application head when the application rollers are in the extended position and wherein the feed stop means projects out of the tape path to permit further feeding of the tape from the tape source through the tape application head when the application rollers are in the retracted position.

3. The corrugated carton sealing apparatus as defined in claim 1 wherein the adhesive tape includes a sticky face surface and wherein the feed stop means engages the sticky face surface to prevent further feeding of the adhesive tape when the application rollers are in the extended position and wherein the feed stop means disengages from the sticky face surface to permit further feeding of the adhesive tape when the application rollers are in the retracted position.

4. The corrugated carton sealing apparatus as defined in claim 3 wherein the feed stop means has a curved surface for engaging with and disengaging from the sticky face surface.

5. The corrugated carton sealing apparatus as defined in claim 1 wherein the tape feed directs the unwound adhesive tape in a prescribed tape path through the tape application head from the tape source to the leading application roller and wherein the tape path intersects the tape stop means when the application rollers are in the extended position and wherein the tape path is spaced from the tape stop means when the application rollers are in the retracted position.

6. The corrugated carton sealing apparatus as defined in claim 1 wherein the adhesive tape has a sticky face surface and wherein the tape feed directs the unwound adhesive tape in a prescribed tape path through the tape application head from the tape source to the leading application roller and wherein the tape feed is responsive to the movement of the application rollers between the extended and retracted positions (1) to engage the sticky face surface of the tape with the tape stop means as the application rollers move from the retracted position to the extended position to prevent further feeding of the tape in the tape path, and (2) to disengage the sticky face surface of the tape from the feed stop means as the application rollers move from the extended position to the retracted position to permit further feeding of the tape in the tape path.

7. The corrugated carton sealing apparatus as defined in claim 6 wherein the feed stop means has a curved surface and wherein the tape is wrapped about the curved surface as the application rollers move from the retracted position to the extended position and wherein the tape is unwrapped from the curved surface as the application rollers move from the extended position to the retracted position.

8. In a corrugated carton sealing apparatus for applying adhesive tape to folded flaps of corrugated cartons as the cartons are moved sequentially past a sealing station in a prescribed path, in which each carton has (1) a leading surface, (2) a folded flap surface, and (3) a trailing surface;

a tape application head mounted at the sealing station for applying a strip of adhesive tape to the carton surfaces of each carton as each carton is moved in the prescribed path past the sealing station, comprising:

a) a tape application head housing supported at the sealing station;

b) a leading application roller and a trailing application roller mounted to the tape application head housing for coordinated movement between (1) an extended position in which the rollers project into the path of each carton for engaging the leading and trailing surfaces, and (2) a retracted position alongside the path of each carton for engaging the folded flap surface;

c) a tape feed for feeding a continuous length of adhesive tape in a tape path through the tape application head to the leading application roller;

d) said tape feed having feed stop means responsive to the movement of the application rollers for stopping the feeding of the adhesive tape through the tape application head as the application rollers are moved to the extended position and for permitting further feeding of the adhesive tape through the tape application head as the application rollers are moved to the retracted position.

9. In the corrugated carton sealing apparatus as defined in claim 8 wherein the feed stop means projects into the tape path to stop further feeding of the tape from the tape source through the tape application head when the application rollers are in the extended position and wherein the feed stop means is spaced from the tape path to permit further feeding of the tape from the tape source through the tape application head when the application rollers are in the retracted position.

10. In the corrugated carton sealing apparatus as defined in claim 8 wherein the adhesive tape includes a sticky face surface and wherein the feed stop means engages the sticky face surface to prevent further feeding of the adhesive tape when the application rollers are in the extended position and wherein the feed stop means disengages from the sticky face surface to permit further feeding of the adhesive tape when the application rollers are in the retracted position.

11. In the corrugated carton sealing apparatus as defined in claim 10 wherein the feed stop means has a curved surface for engaging with and disengaging from the sticky face surface.

12. In the corrugated carton sealing apparatus as defined in claim 8 wherein the tape feed directs the unwound adhesive tape in a prescribed tape path through the tape application head from the tape source to the leading application roller and wherein the tape path intersects the tape stop means when the application rollers are in the extended position and wherein the tape path is spaced from the tape stop means when the application rollers are in the retracted position.

13. In the corrugated carton sealing apparatus as defined in claim 8 wherein the adhesive tape has a sticky face surface and wherein the tape feed directs the unwound adhesive tape in a prescribed tape path through the tape application head from the tape source to the leading application roller and wherein the tape feed is responsive to the movement of the application rollers between the extended and retracted positions (1) to engage the sticky face surface of the tape with the tape stop means as the application rollers move from the retracted position to the extended position to stop further feeding of the tape in the tape path, and (2) to disengage the sticky face surface of the tape from the feed stop means as the application rollers move from the extended position to the retracted position to permit further feeding of the tape in the tape path.

14. In the corrugated carton sealing apparatus as defined in claim 13 wherein the feed stop means has a curved surface and wherein the tape is wrapped about the curved surface as the application rollers move from the retracted position to the extended position and wherein the tape is unwrapped about the curved surface as the application rollers move from the extended position to the retracted position.

15. In the corrugated carton sealing apparatus as defined in claim 8 wherein the tape application head includes (1) a biasing means for moving the application rollers to the extended position when the trailing application roller clears a trailing edge of each carton, and (2) a tape cutter intermediate the application rollers for cutting a tape strip of a prescribed length from the adhesive tape in which the strip has a trailing tape segment that is applied to the trailing surface of the passing carton by the trailing application roller as the trailing application roller moves from the retracted position to the extended position.

16. In the corrugated carton sealing apparatus as defined in claim 15 wherein the biasing means permits the application rollers to move to the retracted position when the leading application roller is engaged and pushed by the leading surface of a moving carton and wherein the tape cutter forms a leading tape segment on a forward end of the tape to be applied to the leading surface of the succeeding carton when the leading surface of the succeeding carton engages the leading application roller.

17. A tape application head for mounting in a corrugated carton sealing apparatus for progressively applying a strip of adhesive tape initially along a portion of an upright leading surface, then over a leading edge, then along a horizontal folded flap surface, then over a trailing edge and then along a portion of an upright trailing surface of each carton of a plurality of cartons that are moved in a prescribed path past a sealing station, comprising:

a) a tape application head housing supportable at the sealing station;

b) said tape application head having a leading application roller and a trailing application roller mounted to the tape application head housing for movement between (1) extended positions in which the rollers project into the path of each carton for engaging the leading and trailing surfaces, and (2) retracted positions alongside the path of each carton for engaging the folded flap surface;

c) said tape application head having a biasing means for biasing the application rollers from their retracted position to their extended position to initially move the trailing roller along the trailing surface of each preceding carton and position the leading application roller in the path of the cartons for engagement with the leading surface of the succeeding carton;

d) said tape application head having a tape feed for feeding adhesive tape in a tape path from a tape source through the tape application head to the leading application roller forming a strip of adhesive tape having a leading surface segment, a leading edge segment, a folded flap segment, a trailing edge segment, and a trailing surface segment for application to the respective carton surfaces and edges, in which the tape feed initially positions a beginning edge of the leading surface segment between the leading application roller and the leading surface of the succeeding carton when the leading application roller is in the extended position;

e) said tape application head having a leading application roller support means operatively connected to the biasing means for movably supporting the leading application roller relative to the tape application head housing, in which the leading application roller (1) when initially engaged by the leading surface of the succeeding carton, moves rearwardly while pressing the beginning edge of the leading surface tape segment against the leading surface to firmly affix the beginning edge to the leading surface of the carton and (2) then moves rearward and inward across the leading surface and around the leading edge to firmly affix the leading tape segment and the leading edge segment to the leading surface and the leading edge of the carton respectively as the leading application roller is moved from the extended position to the retracted position, and (3) then remains relative stationary in the retracted position to affix the folded flap tape segment to the folded flap surface as the horizontal folded flap surface moves past the leading application roller;

f) a tape cutting element for cutting the strip from the tape while the application rollers are in their retracted positions and for forming a new beginning edge on the tape;

g) said tape application head having a trailing application roller support means operatively connected to the biasing means for movable supporting the trailing application roller relative to the tape application head housing, in which the trailing application roller (1) initially remains relatively stationary in its retracted position to affix the folded flap tape segment to the folded flap section as the folded flap surface moves past the trailing application roller, and (2) then moves outward and rearward around the trailing edge and across the trailing surface to affix the trailing edge segment and the trailing surface tape segment to the trailing edge and the trailing surface respectively, as the trailing application roller moves from its retracted position to its extended position; and wherein leading application roller support means causes the application roller to move in an substantially "S" shaped curved path from the extended position to the retracted position in which the curved path has (1) a first section that extends substantially rearward at a gradual slope from the extended position to firmly affix the beginning edge of the leading segment to the leading surface, (2) a second section that extends substantially rearward and inward at a steeper slope than the first section to move more rapidly across the leading surface, and (3) a third section that extends substantially rearward from the second section to the retracted position at a more gradual slope than the slope of the second section to minimize damage to the leading edge of the carton.

18. The tape application head as defined in claim 17 therein the leading applicatin roller support means includes (1) an elongated support arm supporting the leading roller adjacent one arm end, (2) arm support means for supporting the arm for both translational movement and pivotal movement, and (3) pivot means adjacent the other end of the arm for pivoting the arm intermediate the arm ends as the leading application roller moves between the extended position and the retracted position.

19. The tape application head as defined in claim 17 wherein said tape feed has a feed stop means for stopping the feeding of the tape through the tape application head when the application rollers are in the extended position and for permitting further feeding of the adhesive tape when the application rollers are in the retracted position.

20. The tape application head as defined in claim 19 wherein (1) the biasing means moves the application rollers to the extended position when the trailing application roller clears a trailing edge of each carton, and (2) wherein the tape cutter is located intermediate the application rollers for cutting a tape strip of a prescribed length.

21. The tape application head as defined in claim 19 wherein the biasing means permits the application rollers to move to the retracted position when the leading application roller is engaged and pushed by the leading surface of a moving carton and wherein the tape cutter forms a beginning edge of the tape for being applied to the leading surface of the succeeding carton when the leading surface of the succeeding carton engages the leading application roller.

22. The tape application head as defined in claim 19 wherein the feed stop means projects into the tape path to prevent further feeding of the tape from the tape source through the tape application head when the application rollers are in the extended position and wherein the feed stop means projects out of the tape path to permit further feeding of the tape from the tape source through the tape application head when the application rollers are in the retracted position.

23. The tape application head as defined in claim 19 wherein the adhesive tape includes a sticky face surface and wherein the feed stop means engages the sticky face surface to prevent further feeding of the adhesive tape when the application rollers are in the extended position and wherein the feed stop means disengages from the sticky face surface to permit further feeding of the adhesive tape when the application rollers are in the retracted position.

24. The tape application head as defined in claim 23 wherein the feed stop means has a curved surface for engaging with and disengaging from the sticky face surface.

25. The tape application head as defined in claim 19 wherein the tape feed directs the unwound adhesive tape in a prescribed tape path through the tape application head from the tape source to the leading application roller and wherein the tape path intersects the tape stop means when the application rollers are in the extended position and wherein the tape path is spaced from the tape stop means when the application rollers are in the retracted position.

26. The tape application head as defined in claim 19 wherein the adhesive tape has a sticky face surface and wherein the tape feed directs the unwound adhesive tape in a prescribed tape path through the tape application head from the tape source to the leading application roller and wherein the tape feed is responsive to the movement of the application rollers between the extended and retracted positions (1) to engage the sticky face surface of the tape with the tape stop means as the application rollers move from the retracted position to the extended position to prevent further feeding of the tape in the tape path, and (2) to disengage the sticky face surface of the tape from the feed stop means as the application rollers move from the extended position to the retracted position to permit further feeding of the tape in the tape path.

27. The tape application head as defined in claim 19 wherein the feed stop means has a curved surface and wherein the tape is wrapped about the curved surface as the application rollers move from the retracted position to the extended position and wherein the tape is unwrapped about the curved surface as the application rollers move from the extended position to the retracted position.

* * * * *